(12) United States Patent
Yang

(10) Patent No.: US 12,353,758 B2
(45) Date of Patent: Jul. 8, 2025

(54) FLASH MEMORY CONTROLLER, FLASH MEMORY DEVICE, AND CORRESPONDING METHODS FOR REDUCING ERROR RATE OF DATA ACCESS

(71) Applicant: Silicon Motion, Inc., Hsinchu County (TW)

(72) Inventor: Tzu-Yi Yang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/646,740

(22) Filed: Apr. 25, 2024

(65) Prior Publication Data

US 2024/0411482 A1  Dec. 12, 2024

(30) Foreign Application Priority Data

Jun. 12, 2023  (TW) .................................. 112121846

(51) Int. Cl.
*G06F 12/00* (2006.01)
*G06F 3/06* (2006.01)

(52) U.S. Cl.
CPC .......... *G06F 3/0656* (2013.01); *G06F 3/0619* (2013.01); *G06F 3/0659* (2013.01); *G06F 3/0679* (2013.01)

(58) Field of Classification Search
CPC .... G06F 3/0613; G06F 3/0653; G06F 3/0659; G06F 3/0683
USPC ........................................................ 711/154
See application file for complete search history.

(56) References Cited

U.S. PATENT DOCUMENTS

| | | | |
|---|---|---|---|
| 8,898,543 B2* | 11/2014 | Jo ..................... | H03M 13/6306 |
| | | | 714/764 |
| 9,483,347 B2 | 11/2016 | Wu | |
| 11,385,839 B1* | 7/2022 | Chung .................. | G06F 3/0619 |
| 2011/0038206 A1* | 2/2011 | Fujita .................. | G11C 11/5628 |
| | | | 365/185.24 |
| 2012/0317460 A1* | 12/2012 | Chilappagari ...... | G06F 11/1072 |
| | | | 365/185.05 |
| 2014/0075252 A1 | 3/2014 | Luo | |
| 2015/0193157 A1* | 7/2015 | Hwang .................. | G11C 16/06 |
| | | | 714/764 |
| 2019/0088219 A1* | 3/2019 | Ito ........................ | G02F 1/13306 |
| 2021/0295941 A1* | 9/2021 | Asami ..................... | G11C 29/42 |
| 2022/0004456 A1* | 1/2022 | Achtenberg ....... | G11C 16/3404 |
| 2024/0411482 A1* | 12/2024 | Yang ..................... | G06F 3/0619 |

FOREIGN PATENT DOCUMENTS

TW  1725482 B  4/2021

* cited by examiner

*Primary Examiner* — Mohamed M Gebril
(74) *Attorney, Agent, or Firm* — Winston Hsu

(57) ABSTRACT

A method used in a flash memory controller includes: using an error correction code (ECC) circuit to perform an ECC operation upon data of a block of a flash memory chip/die of a flash memory device to generate an ECC result; when the ECC result indicates a failure, storing an access task corresponding to the block into a specific buffer; and, controlling a voltage generator of the flash memory device through a specific communication interface to control at least one address decoder of the flash memory device to access the block of the flash memory chip/die again according to at least one threshold voltage level of the voltage generator after the access task has been temporarily stored in the specific buffer for a specific default time.

20 Claims, 6 Drawing Sheets

FLASH MEMORY CONTROLLER, FLASH MEMORY DEVICE, AND CORRESPONDING METHODS FOR REDUCING ERROR RATE OF DATA ACCESS

BACKGROUND OF THE INVENTION

1. Field of the Invention

The present invention relates to a flash memory access mechanism, and more particularly to a flash memory controller, a flash memory device and a corresponding method.

2. Description of the Prior Art

Generally speaking, if a storage block (or page) of a traditional NAND-type flash memory has not been read/written for a long time, a failure will occur when reading the data of the storage block (or page). The fail bit count (FBC) will significantly increase, and thus the bit error rate when reading the data of the storage block or page will be quite high. In another case, if the bit error rate of the error correction code when accessing the storage block gradually become higher after reading a storage block and the storage block has not yet been accessed again, then this indicates that the threshold voltage distribution of the storage block has a shift.

SUMMARY OF THE INVENTION

Therefore one of the objectives of the present invention is to provide a flash memory controller, a flash memory device and a corresponding method to solve the above-mentioned problems.

According to embodiments of the present invention, a flash memory device is disclosed. The flash memory device is used in a storage device and coupled to a flash memory controller of the storage device through a specific communication interface. The flash memory device comprises an input/output control circuit, a command register, an address register, a memory cell array, at least one address decoder, a voltage generator, a control circuit, and an error correction code circuit. The input/output control circuit is coupled to the flash memory controller through the specific communication interface. The command register is coupled to the input/output control circuit and is used for buffering command information sent from the flash memory controller and transmitted through the input/output control circuit. The address register is coupled to the input/output control circuit and used for buffering address information sent from the flash memory controller and transmitted through the input/output control circuit. The memory cell array has a plurality of flash memory chips, and each flash memory chip has a plurality of flash memory planes. Each flash memory plane has a plurality of storage blocks, and each storage block has a plurality of storage page. The at least one address decoder is coupled to the memory cell array. The voltage generator is coupled between the at least one address decoder and the memory cell array, and is used for generating and outputting at least one threshold voltage level to the at least one address decoder. The control circuit is coupled to the address register, the command register, the voltage generator and the memory cell array, and is used for controlling the voltage generator to control the at least one address decoder accessing a storage block of a flash memory chip of the memory cell array according to the at least one threshold voltage level. The error correction code circuit is coupled between the memory cell array and the input/output control circuit, and is used for performing an error correction code operation upon data of the storage block of the flash memory chip being accessed to generate an error correction code result to the control circuit. When the control circuit determines that the error correction code result indicates an error correction code failure, the control circuit temporarily stores an access task corresponding to the storage block into a specific buffer in the memory cell array, and the control circuit does not control the voltage generator to control the at least one address decoder accessing the storage block of the flash memory chip according to the at least one threshold voltage level again until the temporarily stored access task has been temporarily stored for a specific default time.

According the embodiments, a flash memory controller is disclosed. The flash memory controller is used in a storage device and coupled to a flash memory device of the storage device through a specific communication interface. The flash memory controller comprises an input/output circuit and a processing circuit. The input/output circuit is coupled to the flash memory device through the specific communication interface. The processing circuit is coupled to the input/output circuit, and it comprises a processor, an error correction code circuit, and a specific buffer. The processor is used for controlling the input/output circuit to send command information to the flash memory device through the specific communication interface, and for controlling the input/output circuit to send address information to the flash memory device through the specific communication interface. The error correction code circuit is coupled to the processor and is used for performing an error correction code operation upon data of a storage block of a flash memory chip being accessed in the flash memory device to generate an error correction code result to the control circuit. The specific buffer is coupled to the processor. When the processor determines that the error correction code result indicates an error correction code failure, the processor temporarily stores an access task corresponding to the storage block into the specific buffer, and the processor does not control the control circuit of the flash memory device through the specific communication interface to control the voltage generator of the flash memory device to control the at least one address decoder of the flash memory device accessing the storage block of the flash memory chip again according to the at least one threshold voltage level until the temporarily stored access task has been temporarily stored for a specific default time.

According to the embodiments, a method for a flash memory device used in a storage device and coupled to a flash memory controller of the storage device through a specific communication interface disclosed. The method comprises: providing an input/output control circuit, to be coupled to the flash memory controller through the specific communication interface; providing a command register, to be coupled to the input/output control circuit, to use the command register to buffer command information sent from the flash memory controller and transmitted through the input/output control circuit; providing an address register, to be coupled to the input/output control circuit, to use the address register to buffer address information sent from the flash memory controller and transmitted through the input/output control circuit; providing a memory cell array having a plurality of flash memory chips, each flash memory chip having a plurality of flash memory planes, each flash memory plane having a plurality of storage blocks, each storage block having a plurality of storage page; providing at least one address decoder, to be coupled to the memory cell array; providing a voltage generator, to be coupled between the at least one address decoder and the memory cell array, to use the voltage generator to generate and output at least one threshold voltage level to the at least one address decoder; providing a control circuit to control the voltage generator to control the at least one address decoder accessing a storage block of a flash memory chip of the memory cell array according to the at least one threshold voltage level; providing an error correction code circuit, to be coupled between the memory cell array and the input/output control circuit, to use the error correction code circuit to perform an error correction code operation upon data of the storage block of the flash memory chip being accessed to generate an error correction code result to the control circuit; when determining that the error correction code result indicates an error correction code failure, temporarily storing an access task corresponding to the storage block into a specific buffer in the memory cell array; and not controlling the voltage generator to control the at least one address decoder accessing the storage block of the flash memory chip according to the at least one threshold voltage level again until the temporarily stored access task has been temporarily stored for a specific default time.

According to the embodiments, a method used in a flash memory controller is disclosed. The flash memory controller is used in a storage device and coupled to a flash memory device of the storage device through a specific communication interface. The method comprises: providing an input/output circuit, to be coupled to the flash memory device through the specific communication interface; controlling the input/output circuit to send command information to the flash memory device through the specific communication interface; controlling the input/output circuit to send address information to the flash memory device through the specific communication interface; providing an error correction code circuit to perform an error correction code operation upon data of a storage block of a flash memory chip being accessed in the flash memory device to generate an error correction code result to the control circuit; providing a specific buffer; when determining that the error correction code result indicates an error correction code failure, temporarily storing an access task corresponding to the storage block into the specific buffer; and not controlling the control circuit of the flash memory device through the specific communication interface to control the voltage generator of the flash memory device to control the at least one address decoder of the flash memory device accessing the storage block of the flash memory chip again according to the at least one threshold voltage level until the temporarily stored access task has been temporarily stored for a specific default time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
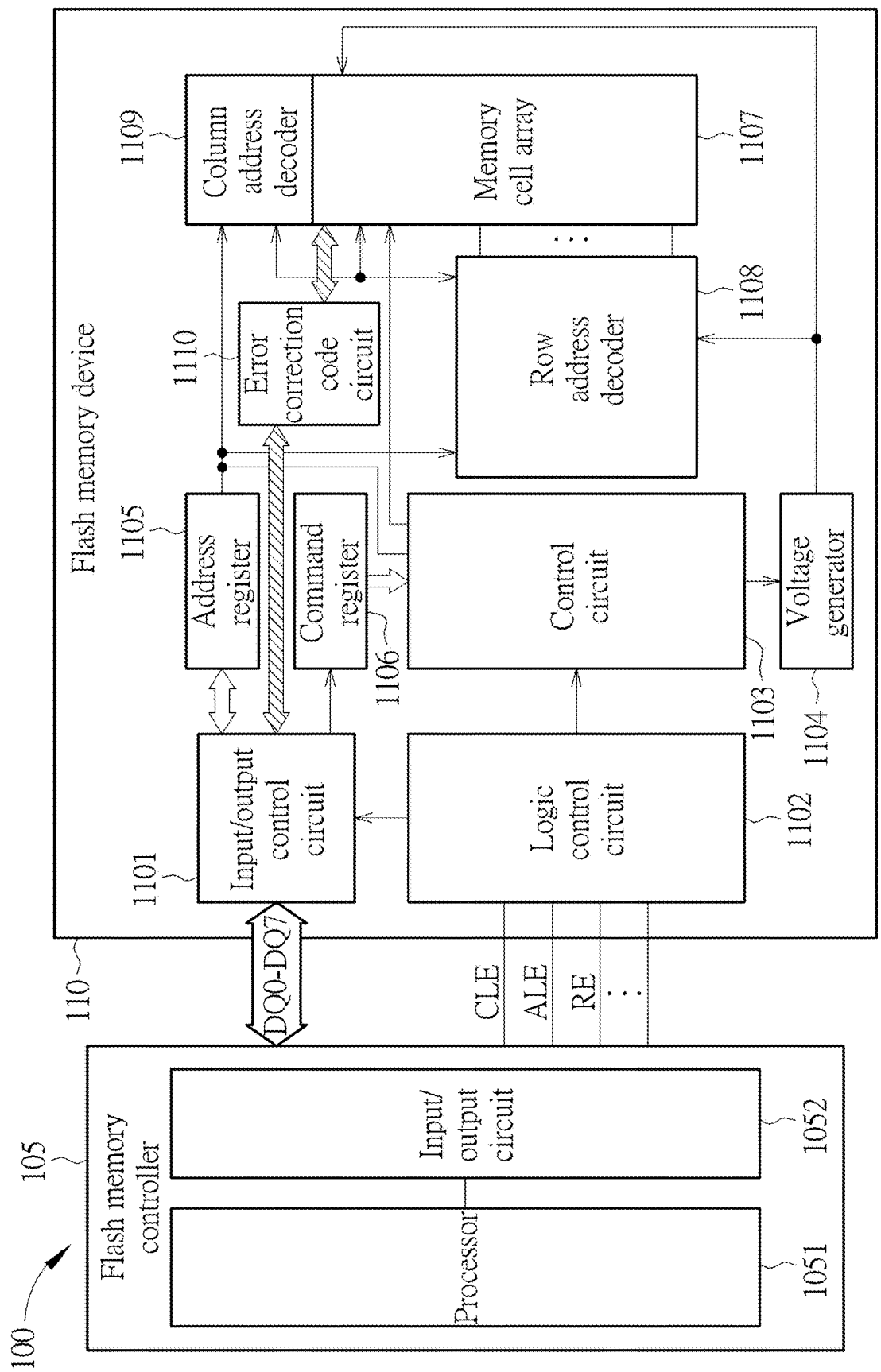
FIG. 1 is a schematic diagram of a storage device including a flash memory controller and a flash memory device according to an embodiment of the present invention.
Figure 2:
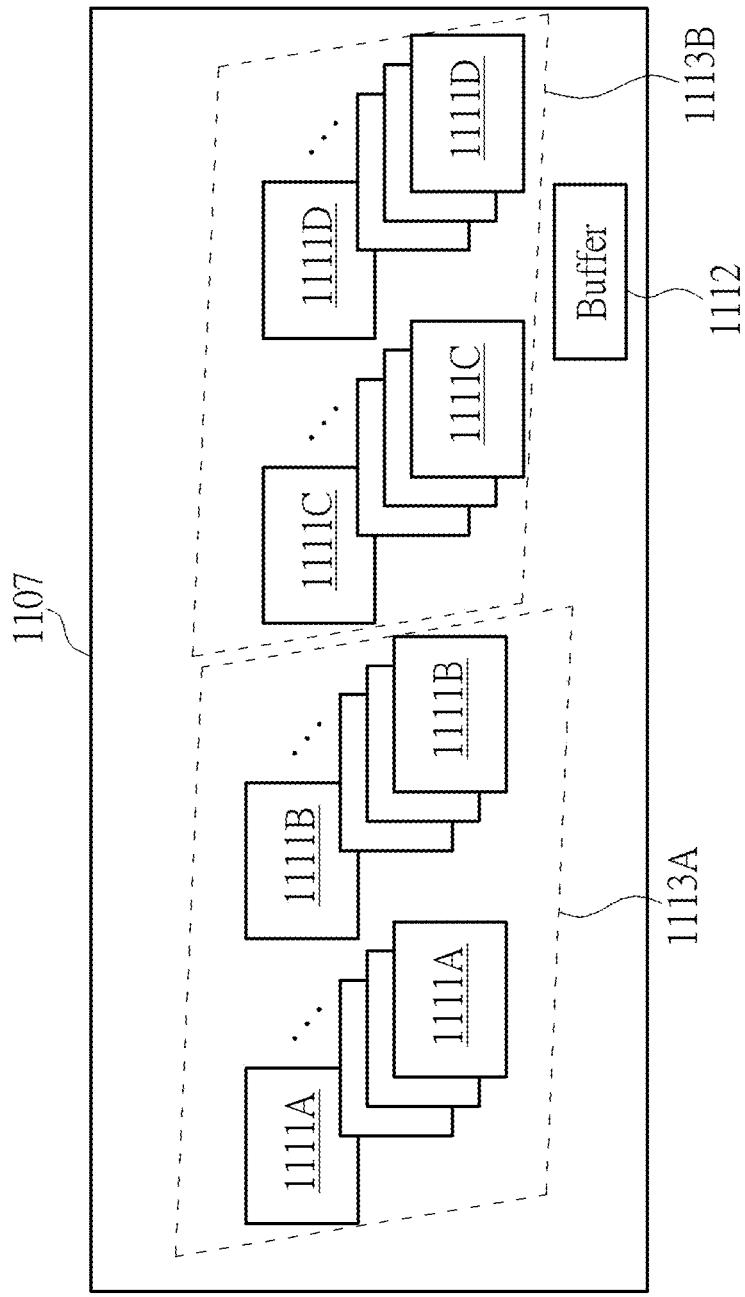
FIG. 2 is a schematic diagram of the memory cell array in FIG. 1 according to an embodiment of the present invention.

Please refer to FIG. 1 in conjunction with FIG. 2. FIG. 1 is a schematic diagram of a storage device 100 including a flash memory controller 105 and a flash memory device 110 according to an embodiment of the present invention. FIG. 2 is a schematic diagram of the memory cell array 1107 in FIG. 1 according to an embodiment of the present invention. The storage device 100 is for example a solid state drive (SSD).

The flash memory controller 105 at least includes a processor 1051 and an input/output circuit 1052. The processor 1051 is coupled to the input/output circuit 1052 and is used to control the input/output circuit 1052 to send access command signal(s)/sequence(s) such as read, write/program or erase command signal(s)/sequence(s) to the flash memory device 110 through a specific communication interface to control and access the flash memory device 110.

The flash memory device 110 is, for example, a NAND-type flash memory device including multiple chips/dies. The flash memory device 110 includes an input/output control circuit 1101, a logic control circuit 1102, a control circuit 1103, a voltage generator 1104 such as a high voltage generator (but not limited), an address register 1105, a command register 1106, a memory cell array 1107, a row address decoder 1108, a column address decoder 1109, and an error correction code (ECC) circuit 1110. The input/output control circuit 1101 is coupled to the flash memory controller 105 through the specific communication interface. The command register 1106 is coupled to the input/output control circuit 1101 and is used for buffering command information sent from the flash memory controller 105 and transmitted through the input/output control circuit 1101. The address register 1105 is coupled to the input/output control circuit 1101 and is used to buffer address information sent from the flash memory controller 105 and transmitted through the input/output control circuit 1101. The at least one address decoder, such as decoders 1108 and/or 1109, is/are coupled to the memory cell array 1107. The voltage generator 1104 is coupled to the at least one address decoder such as 1108 and the memory cell array 1107, and it is used to generate and output at least one threshold voltage level to the at least one address decoder such as 1108. The control circuit 1103 is coupled to the address register 1105, the command register 1106, the voltage generator 1104, and the memory cell array 1107, and it is used to control the voltage generator 1104 to control the at least one address decoder such as 1108 to access a storage block of a flash memory chip of the memory cell array 1107 according to the at least one threshold voltage level. The error correction code circuit 1110 is coupled between the memory cell array 1107 and the input/output control circuit 1101 and is used for performing an error correction code operation upon data of the storage block of the flash memory chip being accessed to generate an error correction code result into the control circuit 1103. When the control circuit 1103 determines that the error correction code result indicates an error correction code failure, the control circuit 1103 temporarily stores an access task corresponding to the storage block into a specific buffer in the memory cell array 1107, and the control circuit 1103 does not control the voltage generator 1104 to control the at least one address decoder such as 1108 to access the storage block of the flash memory chip again based on the at least one threshold voltage level until the buffered access task has been buffered for a specific default time.

In addition, before the temporarily stored access task has been buffered for the specific default time, the control circuit 1103 controls the voltage generator 1104 outputting and maintaining the at least one threshold voltage level to control the at least one address decoder such as 1108 to make the flash memory chip access another storage block of the flash memory chip according to the at least one threshold voltage level, and accessing the another storage block corresponds to another access command. In addition, after accessing each storage block, the control circuit 1103 checks whether the access task temporarily stored in the specific buffer has been temporarily buffered for the specific default time. In addition, when an error correction code failure occurs in accessing the storage block of the flash memory chip again based on the at least one threshold voltage level, the control circuit 1103 controls the voltage generator 1104 adjusting the at least one threshold voltage level to control the at least one address decoder such as 1108 to make the flash memory chip access the storage block of the flash memory chip according to the adjusted at least one threshold voltage level. Additionally, the specific default time is adjustable and is between 100 milliseconds and 3 minutes. In addition, the above-mentioned specific buffer may also be configured inside the flash memory device 110 (for example within the control circuit 1103) instead of being located in the memory cell array 1107.

In practice, the flash memory controller 105 is coupled to the flash memory device 110 through the specific communication interface, and it controls or accesses the flash memory device 110 by sending one or more commands to the flash memory device 110. The specific communication interface of the flash memory device 110 includes, for example, at least one signal port/pin such as data pins DQ0-DQ7 or other data pins (not shown in FIG. 1) and logic control pins such as a command latch enable pin CLE, an address latch enable pin ALE, a read enable pin RE and other logic control pins. The data pins DQ0~DQ7 are coupled to the input/output control circuit 1101, and the logic control pins are coupled to the logic control circuit 1102.

The entire memory cell array 1107 is, for example, a flash memory module and has two or more flash memory chips/dies (LUN). Each flash memory chip/die includes two or more flash memory planes, and each flash memory plane includes multiple storage blocks. Each storage block includes multiple storage pages, and each storage page includes multiple storage sectors. For example, as shown in FIG. 2, the memory cell array 1107 includes two flash memory chips/dies 1113A and 1113B. Each flash memory chip/die 1113A or 1113B includes, for example, two planes, and each plane includes multiple storage blocks, for example, multiple storage blocks 1111A forming a first plane, multiple storage blocks 1111B forming a second plane, multiple storage blocks 1111C forming a third plane, and multiple storage blocks 1111D forming a fourth plane. The first and second planes are located in the flash memory chip/die 1113A, and the third and fourth planes are located in the flash memory chip/die 1113B. The flash memory chip/die 1113A or 1113B may, for example, correspond to the same flash memory channel or correspond to different flash memory channels. In addition, the memory cell array 1107 can make its storage space additionally allocate a storage space of a specific buffer 1112 so that the buffer 1112 can be used as a specific queue (which is described in subsequent paragraphs).

In practice, when the flash memory controller 105 sends command data of a command signal, the flash memory controller 105 controls the signal of the pin ALE to be a low voltage level and controls the signal of the pin CLE to be a high voltage level, so that the flash memory device 110 can know that the data received through the pins DQ0-DQ7 is command data, and then the received command data can be stored in the command register 1106 through the input/output control circuit 1101. The command register 1106 can temporarily store multiple command data. Similarly, when the flash memory controller 105 sends address data, the flash memory controller 105 controls the signal of the pin ALE to be a high voltage level and controls the signal of the pin CLE to be a low voltage level, so that the flash memory device 110 can know that the data received by the pins DQ0-DQ7 is address data, and then the received address data can be stored in the address register 1105 through the input/output control circuit 1101. The address register 1105 can temporarily store multiple address data. For the sake of brevity, the operations related to pin RE and/or other pins (not shown in FIG. 1) are not be described in detail.

In addition, the control circuit 1103 can control the voltage generator 1104 outputting different voltage levels to the row address decoder 1108 and the column address decoder 1109, so that the row address decoder 1108 and the column address decoder 1109 can operate according to these different voltage levels, one or more received addresses buffered in the address register 1105, and one or more received commands buffered in the command register 1106 to control the memory cell array 1107 to perform an access operation such as a read operation, a program operation, or an erase operation. In other words, the flash memory controller 105 can send at least one access/control command to the flash memory device 110 to control the flash memory device 110 to perform at least one access/control task (e.g. a read task, a programming task, or an erase task) to access at least one storage area of at least one flash memory chip included in the flash memory device 110 (or the memory cell array 1107), and the at least one storage area for example is at least one storage plane, at least one storage block, at least one storage page and/or at least one storage sector. For a read task, in this embodiment (but not limited to), the data read from the memory cell array 1107 may have partial bit errors, so the data will first be checked and/or corrected by the error correction code operation performed by error correction code circuit 1110 to generate an error corrected data into the input/output control circuit 1101, and then the error corrected data outputted to the flash memory controller 105. For a write task (or a programming task), the data coming from the input/output control circuit 1101 will be processed through the error correction code operation performed by the error correction code circuit 1110 to generate an error correction code which is to be appended to the data to form a data to be written, and the data to be written is then written into at least one storage block, at least one storage page or at least one storage sector included in the memory cell array 1107. In this embodiment, the error correction code result of the error correction code operation performed by the error correction code circuit 1110 is also transmitted to the control circuit 1103, and the control circuit 1103 can decide whether to control the voltage generator 1104 according to the error correction code result to maintain the originally default output voltage level or to adjust the outputted voltage level, so as to reduce the error rate of data access (such as data reading). The one or more voltage levels are used as threshold voltage levels/values of a flash memory voltage distribution.

Figure 3:
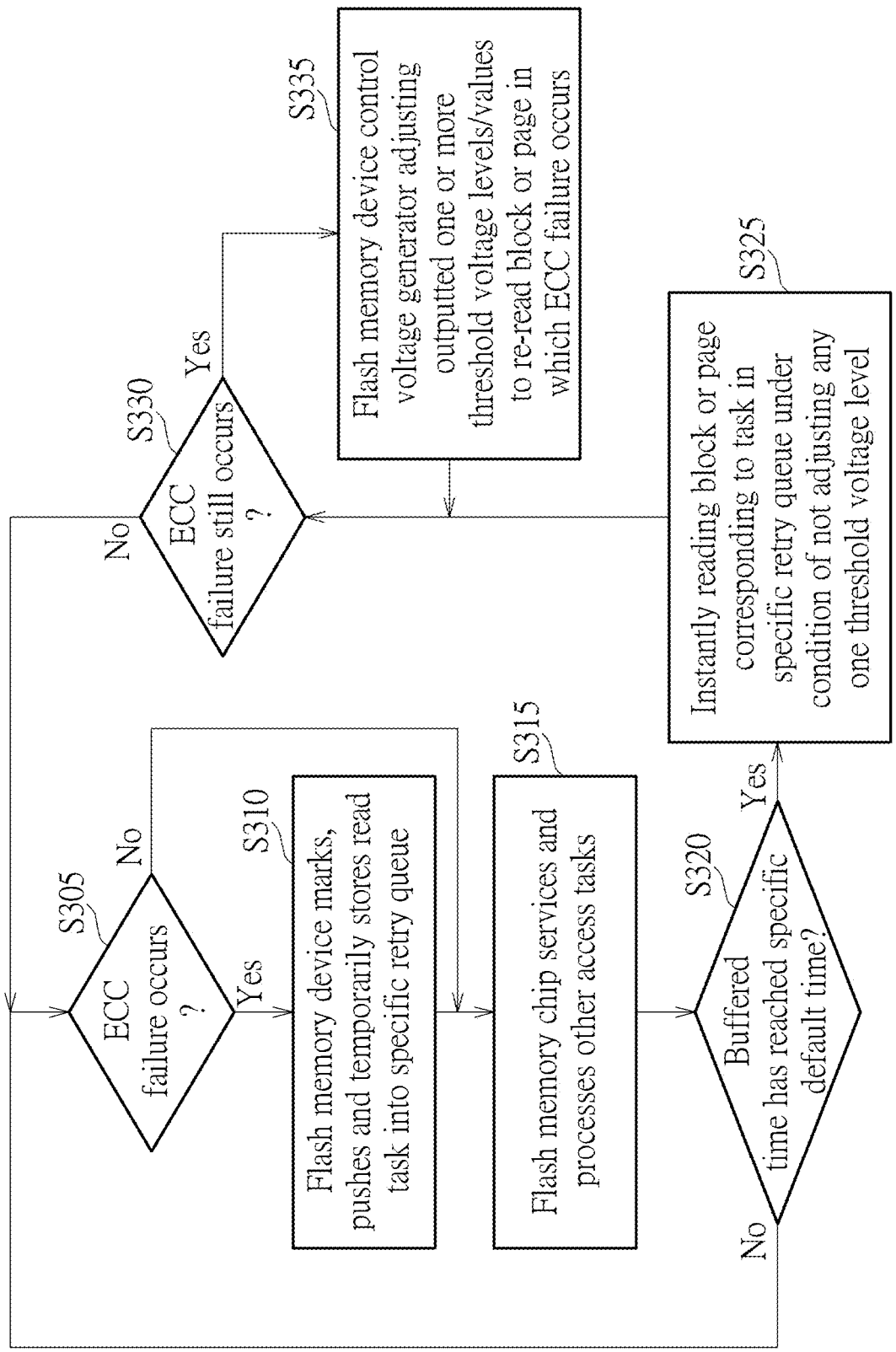
FIG. 3 is a flowchart diagram of the operations of the storage device shown in FIG. 1 according to an embodiment of the present invention.

Refer to FIG. 3. FIG. 3 is a flowchart diagram of the operations of the storage device 100 shown in FIG. 1 according to an embodiment of the present invention. The detailed descriptions of the steps are as follows:

Step S305: The control circuit 1103 of the flash memory device 110 determines whether an error correction code (ECC) failure occurs in any one storage area (such as a storage block or page) of a flash memory chip of the memory cell array 1107 during an execution of an access task (e.g. a read task). If any ECC failure occurs, then the flow proceeds Step S310, otherwise, the flow proceeds Step S315 when no ECC failure occur;

Step S310: The control circuit 1103 of the flash memory device 110 marks, pushes and temporarily stores the access task (such as the read task) corresponding to the storage area (such as the storage block or page) into the buffer 1112 of the memory cell array 1107. The buffer 1112 in this situation is used as a specific retry queue, such as a specific read retry queue, and the queue is a first-in first-out queue;

Step S315: Regardless of whether an ECC failure occurs, the control circuit 1103 of the flash memory device 110 controls the flash memory chip of the memory cell array 1107 to service and process other access tasks (corresponding to the other commands sent by the flash memory controller 105), and the other access tasks are, for example, used to access/read other storage areas (other blocks or other pages) in the same flash memory chip;

Step S320: The control circuit 1103 of the flash memory device 110 determines whether a first task temporarily stored in the specific read retry queue has been temporarily buffered for a specific default time; if it has reached or exceeded the specific default time, then the flow proceeds to step S325, otherwise, if the specific default time has not yet been reached, the flow proceeds to Step S305 to continue to determine whether an ECC failure occurs during the execution of the other access task(s);

Step S325: when the specific default time has been reached, the control circuit 1103 of the flash memory device 110 preliminarily determines that the error rate of data access at this time will be lower and therefore controls the voltage generator 1104 instantly and sequentially read at least one storage area (at least one block or page) corresponding to at least one task in the specific read retry queue (e.g. reading the block or page corresponding to the first read task in the specific read retry queue) under the condition of not adjusting any one threshold voltage level;

Step S330: The control circuit 1103 of the flash memory device 110 determines whether an ECC failure error still occurs under the condition of performing the access operation with not adjusting any one threshold voltage level. If an ECC failure still occurs, then the flow proceeds Step S335; otherwise, if no ECC failure occur under the condition of performing a read operation corresponding to at least one task in the specific read retry queue with not adjusting any one threshold voltage level, then the flow proceeds to Step S305 to continue to determine whether ECC failure occur during execution(s) of the other access task(s); and Step S335: The control circuit 1103 of the flash memory device 110 controls the voltage generator 1104 adjusting the outputted one or more threshold voltage levels/values to make the memory cell array 1107 re-read the storage block(s)/page(s) which the ECC failure occurs in based on the adjusted threshold voltage level(s).

As mentioned above, the flash memory controller 105 in FIG. 1 controls and accesses the flash memory device 110 to perform a work task (or an access task). For example, taking a read task corresponding to a read command sent by the flash memory controller 105 as an example for illustrative, the flash memory device 110 may, for example, read at least one storage block (or at least one storage page) stored in at least one flash memory chip of the memory cell array 1107. The at least one storage block may for example is a single one storage block or a super block formed by multiple storage blocks, and the at least one storage page may be a single one storage page or a super page formed by multiple storage pages. For example, for reading the data of a storage block/page, the data of the storage block/page is data protected by an error correction code, and the error correction code circuit 1110 of the flash memory device 110 will perform an error correction code operation upon the data in the storage block/page. This error correction code operation can correct some errors in the data in the storage block/page. If there are too many errors in the data in the storage block/page, an error of ECC failure will occur. In this situation, the control circuit 1103 of the flash memory device 110, after receiving the ECC failure error result, will determine that the error rate of immediately or subsequently performing a read retry is very high. Therefore, the flash memory device 110 will be controlled not to perform a read retry immediately (or subsequently), and the read task will be pushed to and temporarily stored in the specific retry task queue. In the specific retry task queue, the entry of the read task is marked to indicate a next processing time point (or time stamp), to wait until the error rate of ECC failure is reduced (such as to wait for a specific default time) and then to perform a read retry for the data of the storage block/page.

Figure 4:
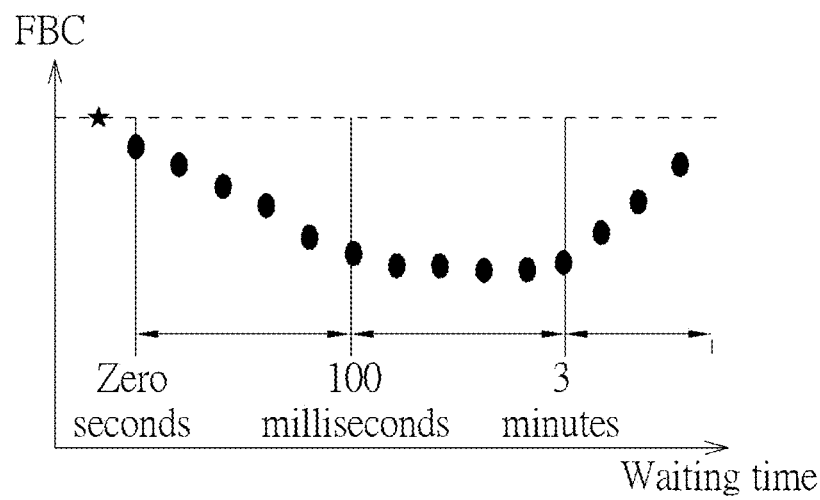
FIG. 4 is a schematic diagram showing the statistical trend of the fail bit count (FBC) of accessing the same storage block/page again by using the identical/non-adjusted threshold voltage level after the flash memory device in FIG. 1 reading the storage block/page and waiting for different times according to one embodiment of the invention.

Please refer to FIG. 4. FIG. 4 is a schematic diagram showing the statistical trend of the fail bit count (FBC) of accessing the same storage block/page again by using the identical/non-adjusted threshold voltage level after the flash memory device 110 in FIG. 1 reading the storage block/page and waiting for different times according to one embodiment of the invention. As shown in FIG. 4, for example (but not limited to), if the same storage block/page is directly accessed or read without waiting (that is, the waiting time is zero seconds), the number of fail bits will be quite high. The statistical trend shows that the number of fail bits will first be decreased as the waiting time becomes longer (e.g. the statistical trend shows that the number of fail bits will be decreased when the waiting time is from zero seconds to 100 milliseconds), then the number of fail bits is lower when the waiting time is from 100 milliseconds to less than 3 minutes, and the number of fail bits is increased when the waiting time begins to exceed 3 minutes. Therefore, the specific default time in this invention may be set at 100 milliseconds. However, this is not a limitation of this invention. The specific default time may also be set at a time between 100 milliseconds and 3 minutes, or it can also be dynamically determined by the user or may be dynamically determined by the flash memory controller 105.

In addition, as described in Step S315, under the condition that the working of the read task has been completed or has not yet been completed, a flash memory chip including the storage block can be used to accept and service at least one control command/task or at least one access command/task of the other flash memory chips to improve the overall efficiency of data processing. In addition, as described in Step S320, for example, after completing at least one other control command/task (or other access command/task(s)), the control circuit 1103 of the flash memory device 110 immediately checks whether the difference between the time point marked on the first one task in the specific read retry queue and the current time point has reached a predetermined time period such as 100 milliseconds (but not limited). When the time difference has reached for example 100 milliseconds, this indicates that the statistical trend showing that the number of fail bits of accessing the same storage block/page is lower, that is, the error rate of ECC failures at this time is lower. Therefore, when the time difference has reached the predetermined time period, the control circuit 1103 stops serving other commands, and instead it controls the voltage generator 1104 not adjusting any one threshold voltage level to instantly re-read at least one storage area (at least one block/page) corresponding to the first one task, as shown in Step S325. Next, if the ECC failure occurs again in the re-read operation instantly executed without adjusting any threshold voltage value, it means that the threshold voltage distribution has been changed. Therefore, as shown in Step S335, the control circuit 1103 of the flash memory device 110 controls the voltage generator 1104 adjusting the outputted one or more threshold voltage level to make the memory cell array 1107 re-read (i.e. read again) the storage block/page, in which the ECC failure occurs, based on the adjusted threshold voltage level(s).

Specifically, the embodiments of the invention can be also applied into the example of intensively reading and writing of multiple pages of a storage block and then suddenly needing to read and write a page of another storage block that has not been accessed for a long time. In this situation, if an ECC error occurs when accessing the page of the another storage block, then the flash memory device can wait for a time period which may be from 100 milliseconds to 3 minutes before accessing the page of the another storage block again, so as to reduce the ECC failure that occurs due to sudden data access.

Figure 5:
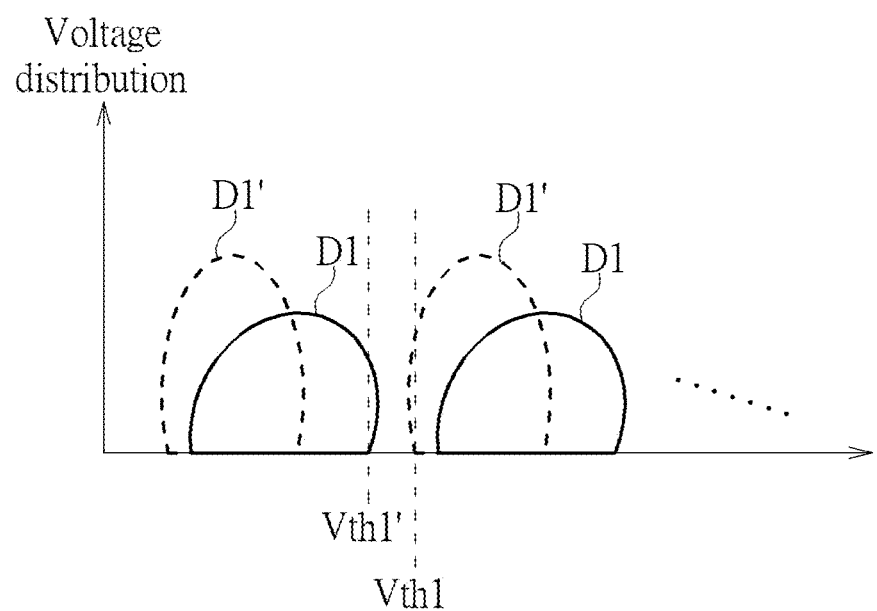
FIG. 5 is a schematic diagram of an example in which the control circuit of the flash memory device shown in FIG. 1 controls the voltage generator outputting and adjusting different threshold voltage levels according to an embodiment of the present invention.

FIG. 5 is a schematic diagram of an example in which the control circuit 1103 of the flash memory device 110 shown in FIG. 1 controls the voltage generator 1104 outputting and adjusting different threshold voltage levels according to an embodiment of the present invention. As shown in FIG. 5, a default/preset unadjusted threshold voltage level Vth1 for example (but not limited) may be used to distinguish two different states of the voltage distribution D1. When an ECC failure occurs again after waiting for a enough cooling time, this may indicate that the voltage distribution D1 may have shifted and became the different voltage distribution D1'. In this situation, the control circuit 1103 can, for example, control the voltage generator 1104 adjusting the threshold voltage level Vth1 as the different threshold voltage level Vth1' to correctly distinguish two different states of the voltage state distribution D1', thereby reducing the error rate of data reading.

Figure 6:
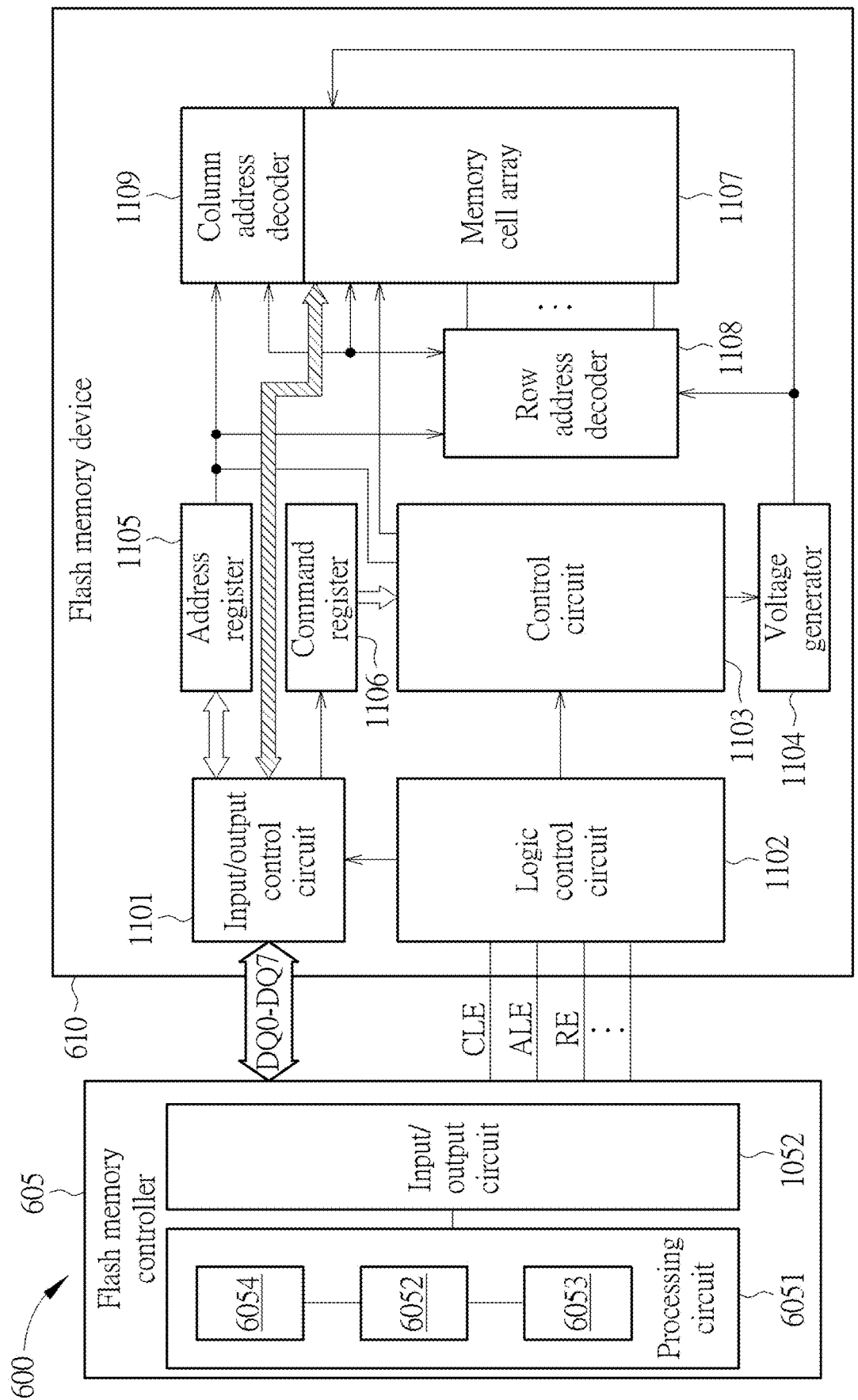
FIG. 6 is an example schematic diagram of a storage device according to another embodiment of the present invention.
Figure 7:
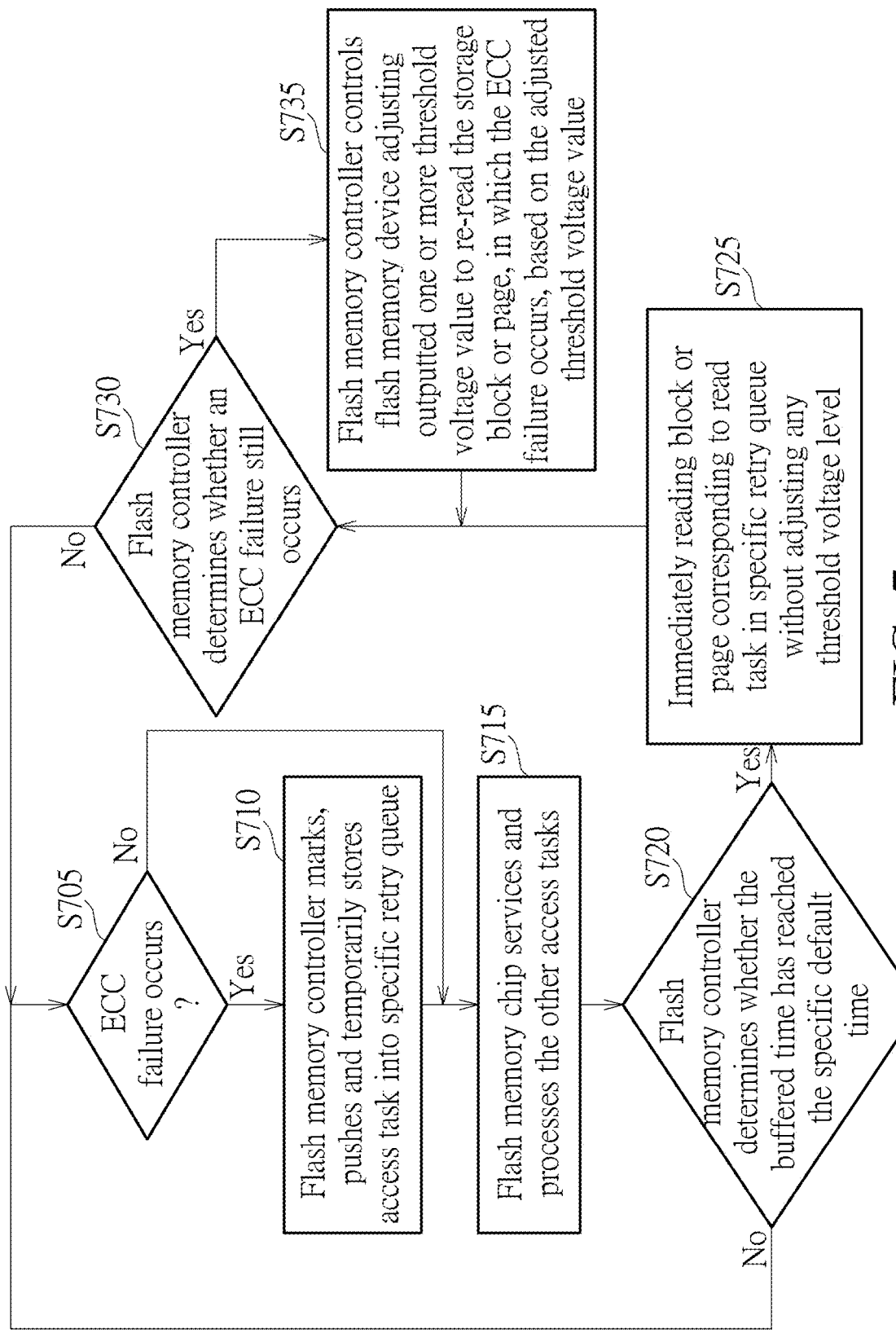
FIG. 7 is a flowchart diagram of the operations of the storage device shown in FIG. 6 according to an embodiment of the present invention.

In addition, in other embodiments, partial processing steps shown in FIG. 3 may be executed by a flash memory controller. For example, the error correction code operations and/or controlling and adjusting different threshold voltage levels can be executed by the flash memory controller. Please refer to FIG. 6 in conjunction with FIG. 7. FIG. 6 is an example schematic diagram of a storage device 600 according to another embodiment of the present invention. FIG. 7 is a flowchart diagram of the operations of the storage device 600 shown in FIG. 6 according to an embodiment of the present invention. The storage device 600 includes a flash memory controller 605 and a flash memory device 610. The flash memory controller 605 at least includes a processing circuit 6051 and an input/output circuit 1052. The processing circuit 6051 is coupled to the input/output circuit 1052 and is used to control the input/output circuit 1052 to send access (such as read, write/program or erase) command signals/sequences to the flash memory device 610 through a specific communication interface to control and access the flash memory device 610. The processing circuit 6051 includes a processor 6052, a specific buffer 6053, and an error correction code circuit 6054. The specific buffer 6053 is also used as a specific retry task queue, and the operation of the error correction code circuit 6054 is similar to that of error correction code circuit 1110 in FIG. 1.

The flash memory device 610 is, for example, a NAND-type flash memory device including multiple chips/dies. The flash memory device 610 includes an input/output control circuit 1101, a logic control circuit 1102, a control circuit 1103, a voltage generator 1104 such as a high voltage generator (but not limited to), an address register 1105, a command register 1106, a memory cell array 1107, a row address decoder 1108, and a column address decoder 1109. The flash memory device 610 in this embodiment excludes an error correction code circuit, and other circuit components having the same serial numbers have the same operations and functions.

The flash memory controller 605 is coupled to the flash memory device 610 through the specific communication interface, and it controls or accesses the flash memory device 610 by sending one or more commands to the flash memory device 610. The processor 6052 can control the input/output circuit 1052 to send command information to the flash memory device 610 through the specific communication interface, and it controls the input/output circuit 1052 to send address information to the flash memory device 610 through the specific communication interface. The error correction code circuit 6054 is coupled to the processor 6052 and is used for performing an error correction code operation upon data accessed from a storage block of a flash memory chip of the flash memory device 610 to generate an error correction code result into the processor 6052. The specific buffer 6053 is coupled to the processor 6052 and is used as a specific task retry queue. When the processor 6052 determines that the error correction code result indicates an error correction code failure, the processor 6052 temporarily stores an access task corresponding to the storage block into the specific buffer 6053. After the temporarily stored access task has been temporarily buffered for a specific default time, the processor 6052 controls the control circuit 1103 of the flash memory device 610 through the specific communication interface to control the voltage generator 1104 of the flash memory device 610 to control at least one address decoder (e.g. 1108) of the flash memory device 610 to access the flash memory device 610 again according to at least one threshold voltage level of the voltage generator 1104 of the flash memory device 610. In addition, before the temporarily stored access task has been temporarily buffered for the specific default time, the processor 6052 of the flash memory controller 605 can control the control circuit 1103 of the flash memory device 610 to control the voltage generator 1104 of the flash memory device 610 to output and maintain the at least one threshold voltage level to control the at least one address decoder (e.g. 1108) of the flash memory device 610, to make the flash memory chip of the flash memory device 610 access another storage block of the flash memory chip according to the at least one threshold voltage level, wherein accessing the another storage block corresponds to another access command. In addition, after accessing each storage block, the processor 6052 checks whether the access task temporarily stored in the specific buffer 6053 of the flash memory controller 605 has been buffered for the specific default time. In addition, when an error correction code failure occurs due to re-accessing the storage block of the flash memory chip according to the at least one threshold voltage level, the processor 6052 can control the control circuit 1103 of the flash memory device 610 to control the voltage generator 1104 of the flash memory device 610 to adjust the at least one threshold voltage level to control the at least one address decoder (e.g. 1108) to make the flash memory chip access the storage block of the flash memory chip according to the adjusted at least one threshold voltage level. Additionally, the specific default time is also adjustable and is between 100 milliseconds and 3 minutes.

Specifically, the flash memory controller 605 (or the processor 6052 of the processing circuit 6051) can send at least one access/control command to the flash memory device 610 to control the flash memory device 610 to perform at least one access/control task (such as a read task, a program task or an erase task) to access at least one storage area of at least one flash memory chip included in the flash memory device 610 (or the memory cell array 1107). The at least one storage area, for example, may be at least one storage plane, at least one storage block, at least one storage page and/or at least one storage sector. For a read task, in this embodiment (but not limited to), the data read from the memory cell array 1107 may have partial bit errors, and thus the data transmitted through the input/output control circuit 1101, the specific communication interface, and the input/output circuit 1052 will be checked and/or corrected by the error correction code operation performed by the error correction code circuit 6054 of the flash memory controller 605 to generate an error-corrected data into the processor 6052. For a write task (or a programming task), data from the processor 6052 will processed by the error correction code operation performed by the error correction code circuit 6054 to generate an error correction code which is appended to the data to form data to be written, and the data to be written is first transmitted through the input/output circuit 1052, the specific communication interface, and the input/output control circuit 1101 and then written into at least one storage block, at least one storage page, or at least one storage sector included by the memory cell array 1107. In this embodiment, the error correction code result of the error correction code operation performed by the error correction code circuit 6054 is also transmitted to the processor 6052, and the processor 6052 based on such result can decide whether to control the control circuit 1103 of flash memory device 610 to control the voltage generator 1104 to maintain the originally default output voltage level or to adjust the outputted voltage level, to reduce the error rate of data access (such as data reading). One or more voltage levels are used as threshold voltage values of the flash memory voltage distribution.

Please refer to FIG. 7. The detailed descriptions of steps in FIG. 7 are as follows:

Step S705: When receiving the error correction code result of the error correction code operation performed by the error correction code circuit 6054 of the flash memory controller 605, the processor 6052 of the flash memory controller 605 determines whether an ECC failure occurs in any one storage area (e.g. a storage block/page) when performing an access task (e.g. a read task) for a flash memory chip of the memory cell array 1107. If any ECC failure occurs, then the flow proceeds to Step S710, otherwise, the flow proceeds to Step S715 if no ECC failure occur;

Step S710: The processor 6052 of the flash memory controller 605 marks, pushes and temporarily stores the access task (such as a read task) corresponding to the storage area (such as a storage block or page) into the buffer 6052 of the flash memory controller 605, wherein the buffer 6053 in this situation is used as a specific retry queue, such as a specific read retry queue, and the queue is a first-in first-out queue;

Step S715: Regardless of whether an ECC failure occurs, the processor 6052 of the flash memory controller 605 controls the control circuit 1103 of the flash memory device 610 to control the flash memory chip of the memory cell array 1107 servicing and processing the other access tasks corresponding to the other commands sent by the flash memory controller 605, wherein the other access tasks are, for example, used to access/read the other storage areas (other blocks or other pages) in the same flash memory chip;

Step S720: The processor 6052 of the flash memory controller 605 determines whether a first one task temporarily stored in the specific read retry queue has been buffered for a specific default time. If the buffered time has reached or exceeded the specific default time, then the flow proceeds to Step S725. Otherwise, if the buffered time has not reached the specific default time, then the flow proceeds to Step S705 to continue to determine whether an ECC failure occurs when performing other access tasks;

Step S725: When the buffered time has reached the specific default time, the processor 6052 of the flash memory controller 605 preliminarily determines that the error rate of access at this time will be low, and thus the processor 6052 of the flash memory controller 605 controls the control circuit 1103 of the flash memory device 610 to control the voltage generator 1104 to immediately and sequentially read at least one storage area (e.g. at least one block or page) corresponding to at least one task in the specific read retry queue without adjusting any threshold voltage level/value, e.g. reading the block or page corresponding to the first read task in the specific read retry queue;

Step S730: The processor 6052 of the flash memory controller 605 determines whether an ECC failure still occurs when accessing (for example, reading) without adjusting any threshold voltage value. If an ECC failure still occurs, then the flow proceeds to Step S735. Otherwise, if no ECC failure occur in the data reading without adjusting any threshold voltage value for at least one task in the specific read retry queue, then the flow proceeds to Step S705 to continue to determine whether an ECC failure occurs for the execution of other tasks; and Step S735: The processor 6052 of the flash memory controller 605 controls the control circuit 1103 of the flash memory device 610 to control the voltage generator 1104 adjusting the outputted one or more threshold voltage value to make the cell array 1107 re-read the storage block or page, in which the ECC failure occurs, based on the adjusted threshold voltage value.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory device used in a storage device, coupled to a flash memory controller of the storage device through a specific communication interface, and the flash memory device comprises:
   an input/output control circuit, coupled to the flash memory controller through the specific communication interface;
   a command register, coupled to the input/output control circuit, for buffering command information sent from the flash memory controller and transmitted through the input/output control circuit;
   an address register, coupled to the input/output control circuit, for buffering address information sent from the flash memory controller and transmitted through the input/output control circuit;
   a memory cell array, having a plurality of flash memory chips, each flash memory chip having a plurality of flash memory planes, each flash memory plane having a plurality of storage blocks, each storage block having a plurality of storage page;
   at least one address decoder, coupled to the memory cell array;
   a voltage generator, coupled between the at least one address decoder and the memory cell array, for generating and outputting at least one threshold voltage level to the at least one address decoder;
   a control circuit, coupled to the address register, the command register, the voltage generator and the memory cell array, for controlling the voltage generator to control the at least one address decoder accessing a storage block of a flash memory chip of the memory cell array according to the at least one threshold voltage level; and
   an error correction code circuit, coupled between the memory cell array and the input/output control circuit, for performing an error correction code operation upon data of the storage block of the flash memory chip being accessed to generate an error correction code result to the control circuit;
   wherein, when the control circuit determines that the error correction code result indicates an error correction code failure, the control circuit temporarily stores an access task corresponding to the storage block into a specific buffer in the memory cell array, and the control circuit does not control the voltage generator to control the at least one address decoder accessing the storage block of the flash memory chip according to the at least one threshold voltage level again until the temporarily stored access task has been temporarily stored for a specific default time.

2. The flash memory device of claim 1, wherein before the temporarily stored access task has been temporarily buffered for the specific default time, the control circuit controls the voltage generator outputting and maintaining the at least one threshold voltage level to control the at least address decoder to make the flash memory chip access another storage block of the flash memory chip according to the at least one threshold voltage level; and, accessing the another storage block is associated with another access command.

3. The flash memory device of claim 1, wherein after accessing each storage block, the control circuit checks whether the access task temporarily stored in the specific buffer has been buffered for the specific default time.

4. The flash memory device of claim 1, wherein when an error correction code failure occurs in accessing the storage block of the flash memory chip again based on the at least one threshold voltage level, the control circuit controls the voltage generator adjusting the at least one threshold voltage level to control the at least one address decoder, to make the flash memory chip access the storage block of the flash memory chip according to the adjusted at least one threshold voltage level.

5. The flash memory device of claim 1, wherein the specific default time is adjustable and is between 100 milliseconds and 3 minutes.

6. A flash memory controller, used in a storage device, coupled to a flash memory device of the storage device through a specific communication interface, and the flash memory controller comprises:
   an input/output circuit, coupled to the flash memory device through the specific communication interface; and
   a processing circuit, coupled to the input/output circuit, comprising:
      a processor, for controlling the input/output circuit to send command information to the flash memory device through the specific communication interface, and for controlling the input/output circuit to send address information to the flash memory device through the specific communication interface;
      an error correction code circuit, coupled to the processor, for performing an error correction code operation upon data of a storage block of a flash memory chip being accessed in the flash memory device to generate an error correction code result to the control circuit; and
      a specific buffer, coupled to the processor;
   wherein when the processor determines that the error correction code result indicates an error correction code failure, the processor temporarily stores an access task corresponding to the storage block into the specific buffer, and the processor does not control the control circuit of the flash memory device through the specific communication interface to control the voltage generator of the flash memory device to control the at least one address decoder of the flash memory device accessing the storage block of the flash memory chip again according to the at least one threshold voltage level until the temporarily stored access task has been temporarily stored for a specific default time.

7. The flash memory controller of claim 6, wherein before the temporary access task has been temporarily buffered for the specific default time, the processor of the flash memory controller controls the control circuit of the flash memory device to control the voltage generator of the flash memory device outputting and maintaining the at least one threshold voltage level to control the at least one address of the flash memory device, to make the flash memory chip of the flash memory device access another storage block of the flash memory chip according to the at least one threshold voltage level, and accessing the another storage block is associated with another access command.

8. The flash memory controller of claim 6, wherein after accessing each storage block, the processor checks whether the access task temporarily stored in the specific buffer of the flash memory controller has been temporarily buffered for the specific default time.

9. The flash memory controller of claim 6, wherein when an error correction code failure occurs in accessing the storage block of the flash memory chip again based on the at least one threshold voltage level, the processor controls the control circuit of the flash memory device to control the voltage generator of the flash memory device adjusting the at least one threshold voltage level to control the at least one address decoder, to make the flash memory chip access the storage block of the flash memory chip according to the adjusted at least one threshold voltage level.

10. The flash memory controller of claim 6, wherein the specific default time is adjustable and is between 100 milliseconds and 3 minutes.

11. A method for a flash memory device used in a storage device and coupled to a flash memory controller of the storage device through a specific communication interface, and the method comprises:
providing an input/output control circuit, to be coupled to the flash memory controller through the specific communication interface;
providing a command register, to be coupled to the input/output control circuit, to use the command register to buffer command information sent from the flash memory controller and transmitted through the input/output control circuit;
providing an address register, to be coupled to the input/output control circuit, to use the address register to buffer address information sent from the flash memory controller and transmitted through the input/output control circuit;
providing a memory cell array having a plurality of flash memory chips, each flash memory chip having a plurality of flash memory planes, each flash memory plane having a plurality of storage blocks, each storage block having a plurality of storage page;
providing at least one address decoder, to be coupled to the memory cell array;
providing a voltage generator, to be coupled between the at least one address decoder and the memory cell array, to use the voltage generator to generate and output at least one threshold voltage level to the at least one address decoder;
providing a control circuit to control the voltage generator to control the at least one address decoder accessing a storage block of a flash memory chip of the memory cell array according to the at least one threshold voltage level;
providing an error correction code circuit, to be coupled between the memory cell array and the input/output control circuit, to use the error correction code circuit to perform an error correction code operation upon data of the storage block of the flash memory chip being accessed to generate an error correction code result to the control circuit;
when determining that the error correction code result indicates an error correction code failure, temporarily storing an access task corresponding to the storage block into a specific buffer in the memory cell array; and
not controlling the voltage generator to control the at least one address decoder accessing the storage block of the flash memory chip according to the at least one threshold voltage level again until the temporarily stored access task has been temporarily stored for a specific default time.

12. The method of claim 11, further comprising:
before the temporarily stored access task has been temporarily buffered for the specific default time, controlling the voltage generator outputting and maintaining the at least one threshold voltage level to control the at least address decoder to make the flash memory chip access another storage block of the flash memory chip according to the at least one threshold voltage level, wherein accessing the another storage block is associated with another access command.

13. The method of claim 11, further comprising:
after accessing each storage block, checking whether the access task temporarily stored in the specific buffer has been buffered for the specific default time.

14. The method of claim 11, further comprising:
when an error correction code failure occurs in accessing the storage block of the flash memory chip again based on the at least one threshold voltage level, controlling the voltage generator adjusting the at least one threshold voltage level to control the at least one address decoder, to make the flash memory chip access the storage block of the flash memory chip according to the adjusted at least one threshold voltage level.

15. The method of claim 11, wherein the specific default time is adjustable and is between 100 milliseconds and 3 minutes.

16. A method used in a flash memory controller, the flash memory controller being used in a storage device and coupled to a flash memory device of the storage device through a specific communication interface, and the method comprises:
providing an input/output circuit, to be coupled to the flash memory device through the specific communication interface;
controlling the input/output circuit to send command information to the flash memory device through the specific communication interface;
controlling the input/output circuit to send address information to the flash memory device through the specific communication interface;
providing an error correction code circuit to perform an error correction code operation upon data of a storage block of a flash memory chip being accessed in the flash memory device to generate an error correction code result to the control circuit;
providing a specific buffer;
when determining that the error correction code result indicates an error correction code failure, temporarily storing an access task corresponding to the storage block into the specific buffer; and
not controlling the control circuit of the flash memory device through the specific communication interface to control the voltage generator of the flash memory device to control the at least one address decoder of the flash memory device accessing the storage block of the flash memory chip again according to the at least one threshold voltage level until the temporarily stored access task has been temporarily stored for a specific default time.

17. The method of claim 16, further comprising:
before the temporary access task has been temporarily buffered for the specific default time, controlling the voltage generator of the flash memory device outputting and maintaining the at least one threshold voltage level to control the at least one address of the flash memory device, to make the flash memory chip of the flash memory device access another storage block of the flash memory chip according to the at least one threshold voltage level, and accessing the another storage block is associated with another access command.

18. The method of claim 16, further comprising:
after accessing each storage block, checking whether the access task temporarily stored in the specific buffer of the flash memory controller has been temporarily buffered for the specific default time.

19. The method of claim 16, further comprising:
when an error correction code failure occurs in accessing the storage block of the flash memory chip again based on the at least one threshold voltage level, controlling the voltage generator of the flash memory device adjusting the at least one threshold voltage level to control the at least one address decoder, to make the flash memory chip access the storage block of the flash memory chip according to the adjusted at least one threshold voltage level.

20. The method of claim 16, wherein the specific default time is adjustable and is between 100 milliseconds and 3 minutes.

* * * * *